(12) United States Patent
Lacourba et al.

(10) Patent No.: US 9,122,613 B2
(45) Date of Patent: Sep. 1, 2015

(54) PREFETCHING OF DATA AND INSTRUCTIONS IN A DATA PROCESSING APPARATUS

(71) Applicant: ARM Limited, Cambridge (GB)

(72) Inventors: Geoffray Matthieu Lacourba, Nice (FR); Philippe Jean-Pierre Raphalen, Valbonne (FR)

(73) Assignee: ARM Limited, Cambridge (GB)

( * ) Notice: Subject to any disclaimer, the term of this patent is extended or adjusted under 35 U.S.C. 154(b) by 243 days.

(21) Appl. No.: 13/788,538

(22) Filed: Mar. 7, 2013

(65) Prior Publication Data

US 2014/0258622 A1 Sep. 11, 2014

(51) Int. Cl.
*G06F 12/08* (2006.01)

(52) U.S. Cl.
CPC ........ *G06F 12/0862* (2013.01); *G06F 12/0811* (2013.01); *G06F 2212/6024* (2013.01)

(58) Field of Classification Search
CPC .............. G06F 12/0862; G06F 12/145; G06F 12/1491; G06F 21/79; G06F 12/0811; G06F 2212/6024; G06F 11/3636; G06F 12/0802; G06F 12/0842; G06F 21/52; G06F 2201/88; G06F 11/3471; G06F 11/3476; G06F 12/0897; G06F 12/10; G06F 12/10; G06F 9/30047
See application file for complete search history.

(56) References Cited

U.S. PATENT DOCUMENTS

| | | | |
|---|---|---|---|
| 7,177,985 B1* | 2/2007 | Diefendorff | 711/137 |
| 2005/0240930 A1* | 10/2005 | Amamiya et al. | 718/100 |
| 2006/0004966 A1* | 1/2006 | Maeda et al. | 711/137 |
| 2007/0294482 A1 | 12/2007 | Kadambi et al. | |
| 2008/0229070 A1 | 9/2008 | Charra et al. | |
| 2008/0229072 A1* | 9/2008 | Yamamura et al. | 712/207 |
| 2008/0307162 A1 | 12/2008 | Maeda et al. | |
| 2010/0268893 A1 | 10/2010 | Luttrell | |
| 2011/0238923 A1* | 9/2011 | Hooker et al. | 711/137 |
| 2011/0264887 A1* | 10/2011 | Craske | 711/205 |
| 2014/0181403 A1* | 6/2014 | Lilly et al. | 711/122 |

OTHER PUBLICATIONS

UK Search Report issued Jun. 16, 2014 in GB 1322866.3 (3 pages).
J. Doweck, "White Paper Inside Intel® Core™ Microarchitecture and Smart Memory Access" 2006, pp. 1-12.
S.P. VanderWiel et al, "Data Prefetch Mechanisms" pp. 1-25, 2006.

* cited by examiner

*Primary Examiner* — Hashem Farrokh
(74) *Attorney, Agent, or Firm* — Nixon & Vanderhye P.C.

(57) ABSTRACT

A data processing apparatus includes a processor and a hierarchical data storage system, including a memory and a cache, for storing the data and the instructions in storage locations identified by physical addresses. The apparatus includes address translation circuitry for mapping the virtual addresses to the physical addresses and load store circuitry receiving access requests from the processor. The store circuitry accesses the translation circuitry to identify physical addresses that correspond to virtual addresses of the received data access requests, and to access the corresponding physical addresses in the hierarchical data storage system. Preload circuitry receives preload requests from the processor indicating virtual addresses storage locations that are to be preloaded. Prefetch circuitry monitors at least some of the accesses performed by the load store circuitry and predicts addresses to be accessed subsequently, and transmits the predicted addresses to the preload circuitry as preload requests.

18 Claims, 6 Drawing Sheets

PREFETCHING OF DATA AND INSTRUCTIONS IN A DATA PROCESSING APPARATUS

TECHNICAL FIELD

The technical field relates to the field of data processing and in particular, to the storing and retrieving of data and instructions that are processed by a processor.

BACKGROUND

Data processors process ever larger amounts of data that require significant storage capacity. Large data stores such as memory take significant time to access and therefore to improve performance, local data stores that are smaller and faster to access such as caches are provided.

These caches are fast to access and improve processor speeds, however, they are costly to implement in power and area and it is therefore important that they store items that it is likely that the processor will require. If they do not store the required data then they simply add area and drain power without adding benefit. In effect the hit rate in these data stores is very important to processor power consumption and performance.

Various techniques have been developed to try to ensure that the caches store appropriate data and instructions. These include techniques where the data or instructions that is to be required or that it is predicted will be required is loaded into the cache in advance using spare loading cycles during processing such that when an access is requested during execution the data is already stored locally in a cache.

One such technique is the preloading of data that is performed in response to instructions from a programmer. When programming a programmer may recognise that a block of data may be required by subsequent code, and instructions to preload the data can be written into the code such that the data is present within the cache when it is required. These preload instructions translate into preloading requests that are sent by the processor to the load store unit or in some cases to a separate preload unit. An address translation is performed and the address is looked for in the cache and if it is not present a linefill request is sent to the load store unit to fill a line in the cache with the data, such that when the processor later requires the data it is present in the cache.

Data may also be prefetched using a prefetch unit. This is a more aggressive technique than preloading where data accesses or instruction accesses are monitored within the load store circuitry and patterns identified and future accesses predicted from these patterns. A disadvantage of the prefetching of data is that the patterns are often identified deep within the load store unit. The load store unit is a complex device that processes data requests and ensures that the ordering of the requests is upheld where required such that data hazards are avoided. Generating additional prefetch requests within the load store circuitry requires the ordering control circuitry to monitor these requests and to ensure that hazards do not arise because of them. Furthermore, it also takes up the resources of the load store unit. The load store unit is a complex device whose resources are valuable such that their use for prefetching may impact performance of the device, which in turn will affect the performance of the processing apparatus. Furthermore, the complexity of the load store unit makes it difficult to validate and adding additional data requests to this device is a potential source of hazards and may require additional validation.

It would be desirable to be able to load data that may be required into a cache in advance without adding too much additional hardware and without requiring complicated validation procedures.

SUMMARY

A first aspect provides a data processing apparatus comprising:
at least one processor for processing data in response to instructions said instructions indicating storage locations for said data and for said instructions by virtual addresses;
a hierarchical data storage system for storing said data and said instructions in storage locations identified by physical addresses, said hierarchical data storage system comprising a memory and at least one cache;
address translation circuitry for mapping said virtual addresses to said physical addresses;
load store circuitry configured to receive access requests from said at least one processor, said access requests indicating storage locations to be accessed as virtual addresses, said load store circuitry being configured to access said address translation circuitry to identify said physical addresses that correspond to said virtual addresses of said received access requests, and to access said corresponding physical addresses in said hierarchical data storage system;
preload circuitry configured to receive preload requests from said processor indicating by virtual addresses storage locations that are to be preloaded into at least one of said at least one caches, said preload circuitry having access to said address translation circuitry such that said corresponding physical addresses can be identified; and
prefetch circuitry configured to monitor at least some of said accesses performed by said load store circuitry and to predict addresses to be accessed subsequently, said prefetch circuitry being configured to transmit said predicted addresses to said preload circuitry as preload requests; wherein
said preload circuitry is configured to respond to said preload requests from said processor and from said prefetch circuitry to preload at least one of said at least one caches with said requested storage locations.

The technology described herein recognises that dedicated preload circuitry may be provided in a data processing apparatus that is separate from the load store unit. This can be advantageous as preload requests are not subject to the same constraints as other access requests, in that the order that they are performed in with respect to each other or to other access requests is not important as they cannot themselves generate a data hazard unless they are allowed to overwrite other data that is required. Furthermore, these requests can be aborted and the processor will still operate correctly. Thus, dedicated preload circuitry that is configured to only handle these preload requests and not to handle general access requests from the processor can be made from far simpler circuitry than the load store unit as no ordering or hazard controls are required.

Thus, in some data processing systems dedicated preload circuitry is provided independently from the load store unit. The present technique recognises that the properties of preload requests that allow them to be handled by this simple circuitry in parallel to the load store unit are the same properties that prefetch requests have. Thus, the preload circuitry that can safely and efficiently handle preload requests could also be used to handle prefetch requests and in this way its resources could be reused to enable prefetching of data to be performed in a safe and area efficient manner without using the valuable resources of the load store unit.

Furthermore, where preload circuitry is already present in the processing apparatus it will have been designed and validated to accept any requests from the core, thus using it to process further requests albeit requests generated by prediction rather than by instructions, means that any requests generated can be safely handled by this circuitry, without the need to add additional data hazard checking or provide further validation.

It should be noted that the preload circuitry is arranged in parallel with and independent from the load store circuitry such that the requests it receives are treated independently to those received by the load store circuitry and validation of the circuitry can also be performed independently to the validation of the far more complex load store circuitry. Furthermore, where there are circumstances that result in the stalling of the load store circuitry, the preload circuitry will not be affected and can continue to operate. Thus, using the preload circuitry to also perform prefetching can lead to significant increases in performance.

It should also be noted that although this technique can be applied for all prefetch requests, be they the prefetching of data or the prefetching of instructions.

In some embodiments, said prefetch circuitry is configured to transmit virtual addresses to said preload circuitry as said predicted addresses, said preload circuitry converting said virtual addresses to said corresponding physical addresses using said address translation circuitry.

Although, the prefetch circuitry may indicate to the preload circuitry the storage location in a number of ways, in some embodiments it uses virtual addresses. An advantage of this is that where the predicted access crosses a page table in the virtual to physical address translations, then this is dealt with automatically by the address translation circuitry accessed by the preload circuitry and the prefetch circuitry need not be concerned with whether or not the access it requests crosses a page table.

In other embodiments, said prefetch circuitry is configured to transmit physical addresses to said preload circuitry as said predicted addresses.

In some cases it is the physical address that is sent to the preload circuitry. Where the prefetch circuitry is monitoring accesses within the load store pipeline to predict subsequent accesses, this monitoring may in some cases be performed a significant way into the load store pipeline at which point the accesses will be using physical addresses and the original virtual address may no longer be available. In such cases it may be easier to simply take the predicted physical address and send it to the preload circuitry along with information that this address should not be translated. This saves address translation costs at this point as the physical address is already known, however a disadvantage is that where a page table is crossed then the prefetch circuitry will need to stop sending predicted addresses as at this point the preload circuitry will not be able to obtain the properties of the physical addresses as the predictions are based upon physical addresses that may not yet have been mapped.

In some embodiments, said prefetch circuitry is configured to transmit predicted physical addresses within a predetermined range to said preload circuitry such that they are located within a same page table as said monitored access requests and on a predicted address being outside of said page table to stop sending said predicted addresses, until said monitored addresses move to a new page table.

As noted previously the prefetch circuitry may use the physical addresses and if this is the case it needs to take care when a page table is crossed. The prefetch circuitry will detect where a predicted access crosses a page table and will stop sending predictions until its monitoring of the accesses detects that the monitored accesses have moved to a new page table. At this point the prefetch circuitry can start sending new predictions. This need to stall predictions when the predictions cross a page table inhibits the prefetch circuitry and delays its predictions.

In some embodiments, said prefetch circuitry is configured to monitor addresses of a set of accesses to said at least one cache and to predict said addresses to be accessed in dependence upon a pattern of said monitored addresses.

Although the prefetch circuitry may predict the future requests in a number of ways, it may be convenient if it monitors the addresses of the accesses to find a pattern and uses this pattern to predict future accesses.

The addresses monitored might be either physical or virtual addresses.

In some embodiments, said prefetch circuitry is configured to monitor addresses of misses in said at least one cache and to predict said addresses to be accessed in dependence upon a pattern of said address misses.

It may be advantageous to monitor misses of accesses to a cache. Misses in a cache delay the processing apparatus and affect performance. Thus, it is important to try to determine where misses occur and to reduce these misses. One way of doing this is for the prefetch circuitry to monitor them and to determine a pattern from the misses and to preload data according to that pattern.

In some embodiments, said hierarchical data store comprises a level 1 data cache which is located close to said at least one processor and is fast to access, a level 2 data cache which is larger than said level 1 data cache and is slower to access, and said preload circuitry is responsive to:

a preload data request received from said at least one processor to update said level 1 data cache with said storage location indicated by said virtual address;

a preload data with intent to write request received from said at least one processor to preload said level 1 data cache with said storage location indicated by said virtual address and to set an exclusive access permission for said storage location such that only said at least one processor issuing said request can access said storage location; and said prefetch circuitry is configured to monitor write misses to said level 1 data cache and to predict said addresses to be accessed in dependence upon a pattern of said write misses and to transmit said predicted addresses with an indication that they should be sent further by the preload circuitry as preload data with intent to write requests such that said level 1 data cache is loaded with said storage locations indicated by said predicted addresses and an exclusive access permission for said storage locations is set.

In some cases the preload circuitry may be configured to respond to different requests and it may be configured to respond to a preload data with intent to write request by setting an exclusive access permission for the storage location that is preloaded. If this is the case, then where the prefetch circuitry is monitoring write misses, it can send its predicted requests to the preload circuitry with an indication that these requests should be converted into preload data with intent to write requests. In this way, the level one data cache can be loaded in an efficient manner with suitable access permissions using requests that are present for other purposes and therefore without requiring any additional overhead.

In some embodiments, said hierarchical data store comprises a level 1 data cache which is located close to said at least one processor and is quick to access, a level 2 data cache which is larger than said level 1 data cache and is slower to access, and said preload circuitry is responsive to:

a preload data request received from said at least one processor to update said level 1 data cache with said storage location indicated by said virtual address;

a preload instruction request received from said at least one processor to update said level 2 cache with said storage location indicated by said virtual address; and said prefetch circuitry is configured to transmit said predicted addresses with an indication that they should be sent further by the preload circuitry as preload instruction requests such that said level 2 cache is loaded with said storage locations indicated by said at least some of said predicted addresses.

The preload circuitry may also be configured to respond to preload instruction requests to load instructions into the level 2 cache. Where such a configuration exists, the prefetch circuitry can take advantage of this and select to load data into the level 2 cache rather than the level 1 cache, by indicating to the preload circuitry that the requests should be sent as preload instruction requests. In this regard, the resources of the level 1 cache are valuable and the prefetch circuitry should not take up too much of this resource if space if there is to be resource available for other processes. Thus, the prefetch circuitry can in some cases determine when it has used a certain amount of the level 1 cache resource and can then simply send subsequent requests with an indication that they should be sent further as preload instruction requests and in this way, the level 2 cache can be loaded with data in a simple way with very little overhead and the resources of the level 1 cache will not be overloaded.

In some embodiments, said load store unit is configured to propagate said virtual address along with said physical address for said access requests at least as far as a bus interface unit, which controls access to a bus via which said hierarchical data store is accessed;

said prefetch circuitry being configured to monitor said access requests transmitted by said bus interface unit.

Where the prefetch circuitry transmits virtual addresses to the preload circuitry then it needs to be able to obtain these in some way. In this regard where the monitoring of the accesses occurs within the load store unit then it may be that the physical addresses are monitored and the original virtual addresses are no longer available. Thus, in some embodiments it is advantageous if the load store unit is configured to propagate the virtual address along with the physical address at least as far as the bus interface. In many situations the prefetch circuitry monitors the access requests at or before the bus interface. The sending of the virtual addresses in parallel with the physical addresses will have some additional area overhead but does allow the prefetch circuitry to use virtual addresses as its predicted addresses which means that it does not have to stall its predictions when page tables are crossed.

In some embodiments, said preload circuitry comprises arbitration circuitry configured to arbitrate between requests received from said processor and said prefetch circuitry and to prioritise requests received from said processor.

The preload circuitry will receive requests from the processor and from the prefetch circuitry and will arbitrate between them using arbitration circuitry. Generally the requests from the processor will be prioritised as these are requests from the programmer indicating data that is required or is very likely to be required while the prefetch circuitry are requests for data that are more speculative and it is only that it is predicted that they will be required.

A second aspect of the present invention provides a method of preloading storage locations within a hierarchical data storage system within a data processing apparatus, said data processing apparatus comprising at least one processor for processing data in response to instructions said instructions indicating storage locations for said data and for said instructions by virtual addresses, address translation circuitry for converting said virtual addresses to said physical addresses; said hierarchical data storage system storing said data and said instructions in storage locations identified by physical addresses, said hierarchical data storage system comprising a memory and at least one cache; said method comprising receiving access requests from said at least one processor at load store circuitry, said access requests indicating storage locations to be accessed as virtual addresses accessing address translation circuitry to convert said virtual addresses of said received access requests to corresponding physical addresses, and accessing said corresponding physical addresses in said hierarchical data storage system;

receiving preload requests from said processor indicating by virtual addresses storage locations that are to be preloaded into one of said at least one caches, at preload circuitry;

identifying corresponding physical addresses using said address translation circuitry;

loading said storage locations into one of said at least one caches; and monitoring at least some of said accesses performed by said load store circuitry and predicting addresses to be accessed subsequently using prefetch circuitry;

transmitting said predicted addresses to said preload circuitry as preload requests;

loading said requested storage locations into one of said at least one cache.

A third aspect of the present invention provides a data processing apparatus comprising:

at least one processing means for processing data in response to instructions said instructions indicating storage locations for said data and for said instructions by virtual addresses;

a hierarchical data storage means for storing said data and said instructions in storage locations identified by physical addresses, said hierarchical data storage means comprising a memory and at least one caching means;

address translation means for mapping said virtual addresses to said physical addresses;

load store means for receiving access requests from said at least one processing means, said access requests indicating storage locations to be accessed as virtual addresses, said load store means being configured to access said address translation circuitry to identify said physical addresses that correspond to said virtual addresses of said received access requests, and to access said corresponding physical addresses in said hierarchical data storage system;

preload means for receiving preload requests from said processing means indicating by virtual addresses storage locations that are to be preloaded into at least one of said at least one caching means, said preload means having access to said address translation means such that said corresponding physical addresses can be identified; and prefetch means for monitoring at least some of said accesses performed by said load store means and for predicting addresses to be accessed subsequently, said prefetch means transmitting said predicted addresses to said preload means as preload requests; wherein said preload means is for preloading at least one of said at least one caching means with said requested storage locations in response to said preload requests from said processing means and from said prefetch means.

The above, and other objects, features and advantages of this invention will be apparent from the following detailed description of illustrative embodiments which is to be read in connection with the accompanying drawings.

DESCRIPTION OF THE EXAMPLE NON-LIMITING EMBODIMENTS

Figure 1:
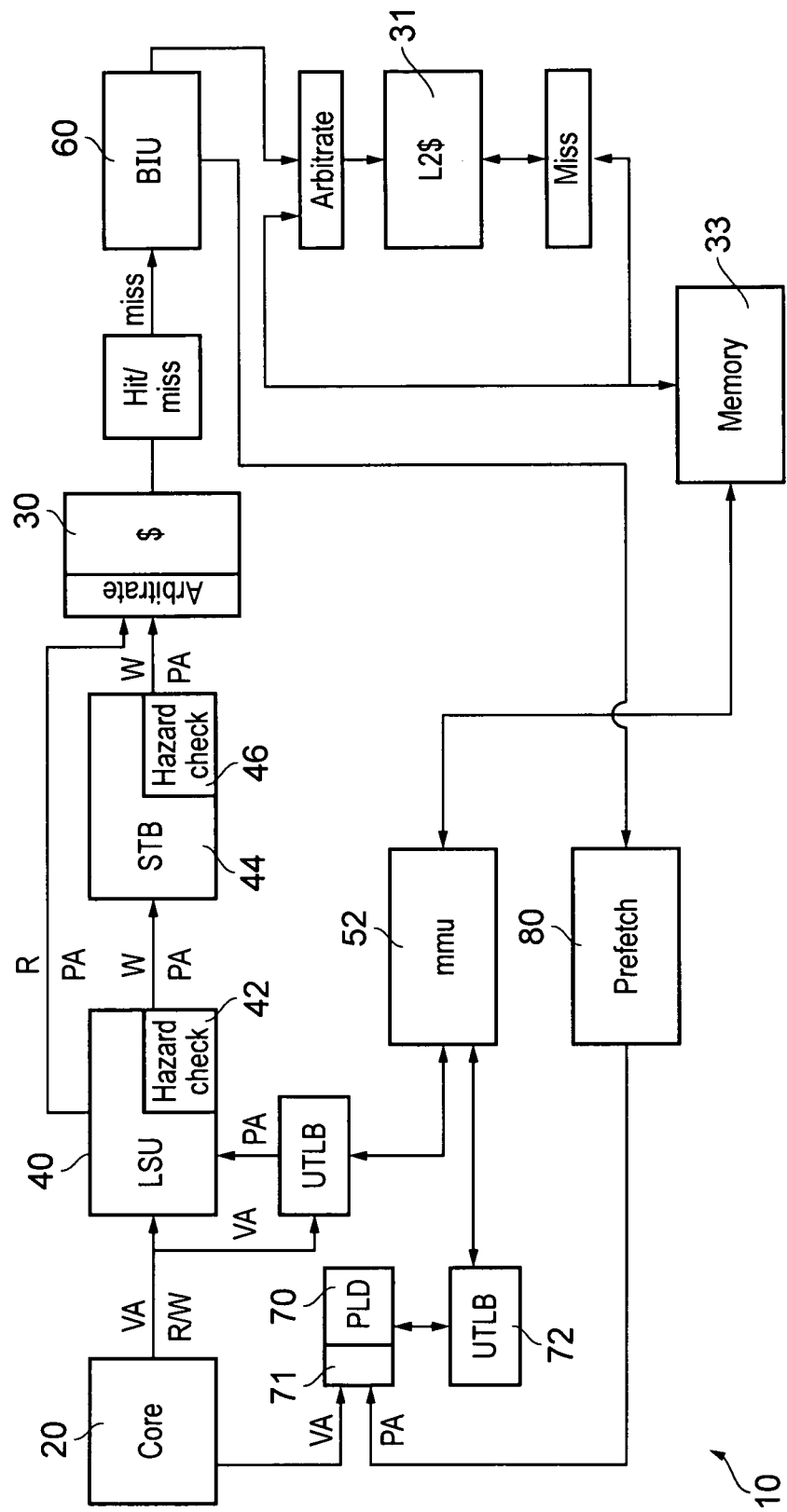
FIG. 1 shows a portion of a data processing apparatus including the load store pipeline according to an embodiment of the present invention.

FIG. 1 shows a portion of a data processing apparatus 10 according to an embodiment of the present invention. The data processing apparatus 10 has a core 20 for processing data. Core 20 generates data access request for accessing data which is stored in a hierarchical memory system comprising a level 1 cache 30, a level 2 cache 31 and memory 33. The data access requests consist of reads and writes and indicate the storage locations to be accessed using virtual addresses. The processor core 20 transmits these access requests to a load store unit 40 which manages the access to the data stored in the hierarchical memory system, 30, 31, 33.

The data access requests may take different lengths of time to complete depending on the data store that the data is currently stored in. Care must therefore be taken that data hazards do not arise due to a later instruction in the instruction stream completing before an earlier one and writing to a storage location that the earlier instruction is to read. Thus, the load store unit 40 is a complex device and comprises hazard checking logic 42 which monitors and controls the ordering that the accesses complete in and checks for any potential data hazards.

As the processor core 20 identifies the storage location of the data to be accessed using virtual addresses these must be converted to physical addresses so that the actual storage location can be identified. In this regard virtual addresses are used by processors to reduce the number of bits required to identify an address location or to allow several processes to access a restricted memory space. The actual storage locations are identified by physical addresses so that a translation of virtual to physical addresses needs to be performed to locate the actual storage location.

A complete set of current mappings for virtual to physical addresses are stored in memory. The mapping of virtual to physical address space is done in blocks and these may vary in size, thus, these are for example blocks of 1 Gbyte, 2 Mbyte or 4 Kbyte. The number of bits that need to be mapped for a translation depends on the size of the block that an address is located in. If, for example, an address is in a 2 Mbyte block, then only the higher n to 21 bits need to be found from the translation tables, while if it is in the 4 Kbyte block then the n to 12 bits need to be found. In order to decrease access time to these mappings, recently used mappings are stored in caches that can be accessed more quickly by the processor. These are in the form of μTLBs that store a small subset of recently used mappings.

In this case, the virtual address of a data access to be sent to the load store unit 40 is also transmitted to a μTLB 50 which stores a subset of page tables mapping virtual addresses to physical addresses. It has a limited storage capacity and thus, stores perhaps a single page table mapping 4 KB of memory. Memory management unit 52 has access to the other page tables which may be stored locally within a cache within the memory management unit 52 or within memory 33. If a data access to the μTLB 50 does not find the address within the store then a request is sent by the μTLB to memory management unit 52 and the page tables within the μTLB are updated and the cache in the memory management unit 52 is also updated.

If the data access request is a read then once the physical address has been retrieved the read request is transmitted to the level 1 data cache 30. If it is a write then it is sent via the store buffer 44 which has its own hazard checking unit 46. This issues a write request using the physical address to the level one cache 30.

Arbitration circuitry within the level one cache 30 arbitrates between the different requests it receives and selects them in turn. In response to each selected request a lookup is performed in the level 1 cache 30 and if there is a hit the data value is returned in the case of a read or in the case of a write the data value is written. If there is a miss then this information is sent to the bus interface unit 60 which will then request a linefill for the data request and will look for the storage location first in the level two cache 32 and if it is not there then in the level three memory 33. A linefill is then performed with the storage location being loaded into the level 1 cache. Accesses to the lower level memories take some time so that it may be a while before the data is returned to the level 1 cache 30.

In parallel to the load store unit 40 there is also a preload unit 70 which receives preload requests from the processor core 20 which also indicates storage locations to be accessed using virtual addresses. Preload circuitry 70 has its own μTLB 72 which it accesses to perform the address translation. The preload circuitry will send the request directly to the level 1 cache 30 once it has retrieved the physical address and the address will be looked for in the level 1 cache and if it is not present it will be preloaded by the bus interface unit 60 from one of the lower level data stores.

If the preload unit 70 determines that the virtual address is not present in its μTLB 72 then it will ask for a page table update from the memory management unit 52. The preload unit 70 will also check the attributes associated with the page table that the virtual address is within and if these indicate that that section of the memory is not a cacheable section then it will know that it must not write this value to the cache and will simply drop the request. This is acceptable as the dropping of preload requests will not affect the safe operation of the processor core.

Preload circuitry 70 also receives data access requests from prefetch circuitry 80. Prefetch circuitry 80 monitors data accesses issued from the bus interface unit 60 in response to misses in the level one cache. It determines patterns in the monitored misses and predicts data accesses that are likely to occur next from these patterns and sends these as predicted requests to the preload unit 70.

In this embodiment, it monitors the physical addresses and sends the request as physical addresses to the preload unit 70. These have an indication associated with them indicating to the preload unit 70 that they are already physical addresses and need not be looked up in the μTLB 72. However, the preload unit 70 must have access to the appropriate page table to be able to check the attributes of this region of memory in case it is a non-cacheable region. Thus, the prefetch unit 80 will detect a pattern and predict accesses from that pattern. When one of its predicted accesses crosses a page table boundary it will stop predicting and will start monitoring again until it detects accesses to a new page table, whereupon it will determine a pattern and generate new predictions which it will then send to the preload circuitry 70. This inability to cross page tables does add some delay to the circuitry as it causes the prediction to stall awaiting a new page table. However, as the prefetch circuitry 80 is simply an optimization such disadvantages can be tolerated.

Preload circuitry 70 will have arbitration circuitry 71 within it which will arbitrate between the requests received. In particular, the requests from the core will generally receive a higher priority than the requests from the prefetch unit, as they are requests that are more likely to be required by the processor core 20 processing data, as they are generated by the programmer rather than by a prediction made from analysing patterns in current accesses.

As all of the requests relate to the loading of data into the cache that may later be required by a processing operation the aborting of any of these requests or the execution of them out of order will not affect the safe running of the processor only its performance. For this reason, the preload unit 70 can be far simpler than the load store unit 40 and can operate in parallel to it without requiring hazard checkers. The core may also have a separate generator for generating addresses for the preload requests which is far simpler than the address generator that it uses for load store requests.

Although the prefetch circuitry is shown as monitoring the access requests at the bus interface unit 60 to the level 2 cache 32 which correspond to misses in the level 1 cache, other portions of the data request stream may be monitored depending on the portion that is required to be optimised. Thus, for example, requests to the level 1 cache itself may be monitored or those to memory 33.

Figure 2:
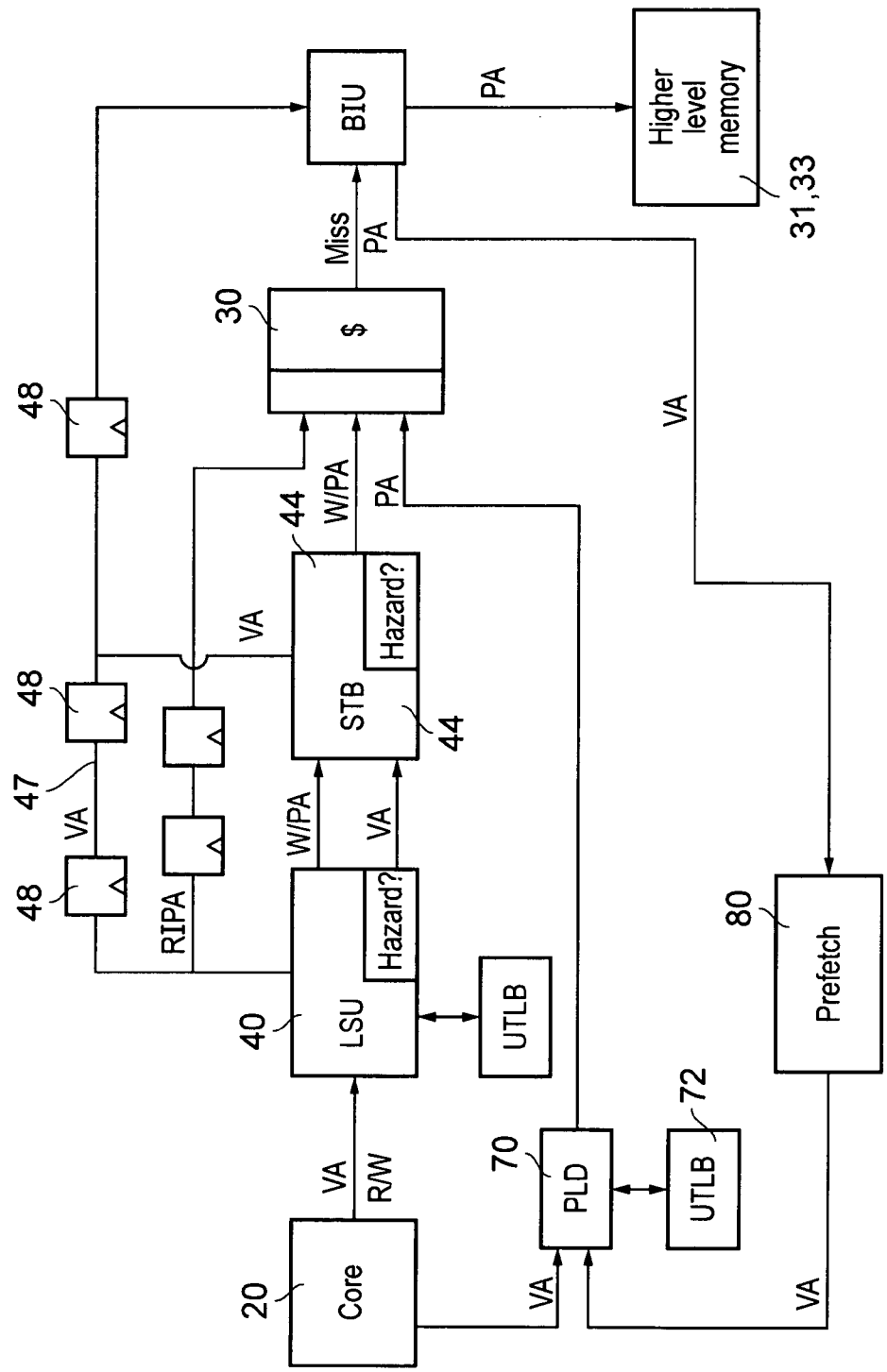
FIG. 2 shows a further embodiment of a portion of a data processing apparatus according to an embodiment of the present invention.

FIG. 2 shows a further embodiment of a portion of a data processing apparatus 10 which comprises multiple cores, although only one core 20 is shown. In this embodiment the prefetch circuitry 80 generates requests using virtual addresses. Thus, the preload unit 70 will need it to perform an address translation for both the requests received from the core 20 and the requests received from the prefetch circuitry 80. An advantage of this is that the prefetch circuitry does not have to stall when the predicted requests cross page tables, as address translations will be performed for each request. As a virtual address is sent to the preload circuitry 70 if a page table is crossed then the μTLB simply requests a new table from the memory management unit which is not shown in this figure and the μTLB 72 is updated with the requested table.

In order to allow the prefetch circuitry 80 to predict the future data accesses using virtual addresses, the virtual addresses of the access being requested by the load store unit need to be transmitted with the requests to the portion of the data access request stream that the prefetch circuitry is monitoring. In this embodiment it is monitoring the output of the bus interface unit 60. Thus, the virtual addresses are transmitted in parallel to the actual requests along a separate data path 47. This requires additional flops 48.

In some embodiments, the preload unit 70 can handle several different types of request. Thus, there may be preload data requests which simply request that the data is preloaded into the level 1 cache. There may be preload write requests which request that the storage location is loaded into the level 1 cache and is marked as exclusive use for the core that generated the request. There may also be preload instruction requests that request an instruction to be preloaded into the level 2 cache. As the preload circuitry 70 is designed to process all these different types of requests, the prefetch circuitry 80 can mimic these requests and in this way requests with particular properties can be made. Thus, it may choose to prefetch data into the level 2 cache if it determines that the level 1 cache has already preloaded significant amounts of data, such that its resources may be becoming strained.

In this regard, the prefetch circuitry will generally limit the amount of data it prefetches into the level 1 cache so as not to over fill it with data that may not be required.

The prefetch circuitry 80 may also be monitoring writes and in which case it may be useful not just to preload the data into the level 1 cache but to mark it as exclusive use for a particular core. This is simply done by mimicking the write requests that the core generates and that the preload circuitry 70 is configured to respond to.

Figure 3:
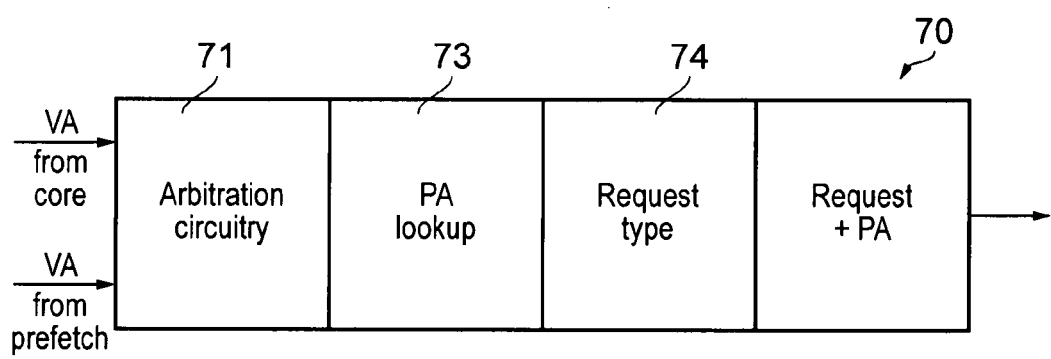
FIG. 3 shows preload circuitry.

FIG. 3 shows preload circuitry 70 in more detail. As can be seen in this embodiment it receives requests from the core and requests from the prefetch unit and in this embodiment these requests both identify locations using virtual addresses. These requests are prioritised by arbitration circuitry 71 and then a physical address lookup is performed by circuitry 73 that accesses the μTLB associated with the preload circuitry. Circuitry 74 then identifies the request type and sends the suitable request further to the level 1 data cache along with the physical address.

Figure 4:
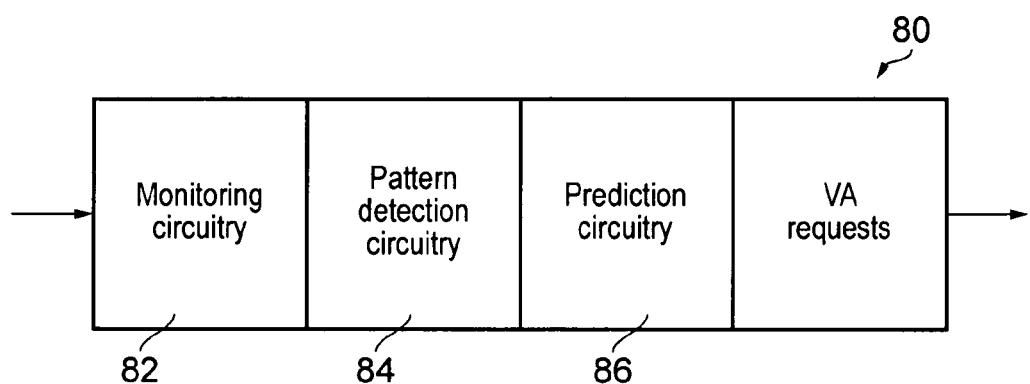
FIG. 4 shows prefetch circuitry.

FIG. 4 shows prefetch circuitry 80 according to an embodiment of the present invention. Prefetch circuitry 80 receives information from a data access request stream that it is monitoring and monitoring circuitry 82 monitors the stream and pattern detection circuitry 84 detects patterns within it. In this case the stream monitored is a stream of virtual addresses, and thus, prediction circuitry 86 predicts from the patterns detected what it expects the virtual addresses of future data accesses to be and sends requests with these virtual addresses to the preload circuitry. The prediction circuitry may generate different types of request depending on the nature of the predicted request. Thus, it may generate standard data requests which are translated by the preload circuitry as standard preload requests. Where the prefetch is for a write, the prefetch circuitry may request a preload write request such that when executed the cache is marked with exclusive use for a particular core that it is predicting will make the request. Where the prefetch circuitry has already generated a number of requests to the level 1 cache it may generate further requests as instruction preload requests such that the predicted data is loaded into the level 2 cache and the level 1 cache is not overfilled. In this regard, the prefetch circuitry may be assigned a number of resources of the level 1 cache that it is allowed to take, and when the prefetch circuitry determines that this number has been reached it will send further requests as instruction preload requests such that any further data is loaded into the level 2 cache.

For example, the prefetcher may be assigned a resource of 4 linefills in the level 1 cache and it may therefore take an advance of 4 linefills for the predicted next four data accesses in a data stream. For the subsequent accesses with a greater advance it will request instruction preloads such that the next predicted data accesses ($5^{th}$, $6^{th}$ etc.) are loaded into the level 2 cache. When the resources used by the prefetcher fall below 4, then it can ask for the next predicted accesses to be loaded into the level 1 cache, these may already have been loaded into the level 2 cache such that they can be retrieved quickly.

In this way the number of resources of the level 1 cache taken up by prefetch can be limited in a simple manner.

Figure 5:
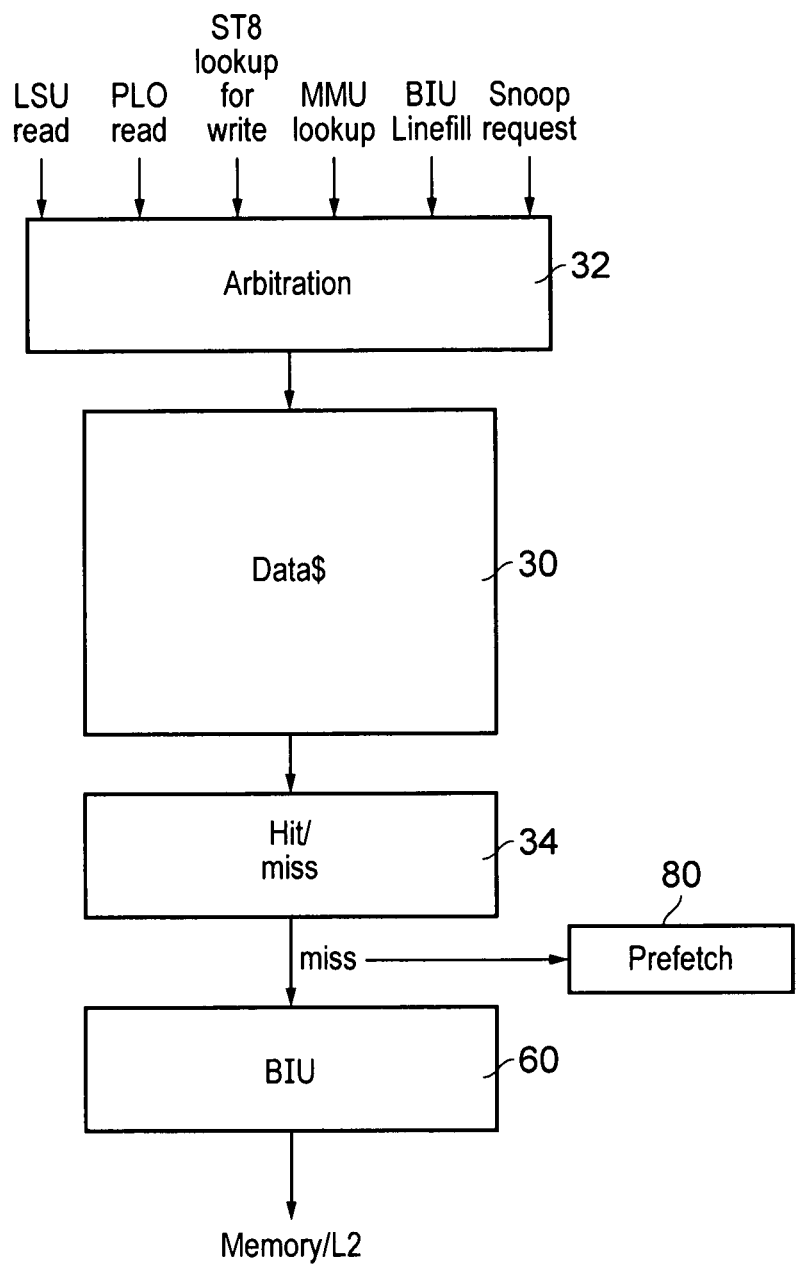
FIG. 5 shows access to a level one data cache.

FIG. 5 shows the level 1 data cache 30 with arbitration circuitry 32 and with hit/miss circuitry 34 connected to the bus interface unit 60. The arbitration circuitry 32 receives requests from various sources including requests from the load store unit in the form of reads, requests from the preload unit in the form of reads, requests from the store buffer in the form of lookups for writes, requests from the MMU in the form of lookups, requests from the bus interface unit 60 in the form of linefill requests in response to a miss in the data cache and snoop requests from cache coherency circuitry. The reads received from the preload unit have a different format from those received from the load store unit such that the arbitration circuitry can identify them. In this regard, the dropping of reads from the preload unit will not cause any errors while those from the load store unit need to complete.

The arbitration circuitry 32 will arbitrate between the requests and will forward them to the level 1 data cache 30 depending on their priority. A request may then hit in the cache, in which case in the case of a read request from the load store unit the data will be return whereas in the case of a preload read request nothing more will happen and the request will simply be dropped as no preloading of data is required as the data is already present in the cache. If the request misses then the data will be requested via the bus interface unit 60 which will process the miss to retrieve the data from either the level 2 cache or from memory whereupon it will return the data to the level 1 cache via arbitration circuitry 32 in the form of a linefill request.

In the case of a write request the line will be allocated for use by the write. If the address is not present in the level 1 cache then a miss will occur and this will be transmitted further to the bus interface unit 60 which will process the miss to retrieve the line from either the level 2 cache or from memory whereupon it will return it to the arbitration circuitry 32 as a linefill request. The linefill request will simply allocate a line in that cache to that address. Prefetch circuitry 80 will monitor one of these request streams to determine any patterns within the request stream and will predict future accesses from the detected patterns. In this case the prefetch circuitry 80 is shown as monitoring the misses coming out of the hit/miss circuitry 34.

As the preload circuitry accesses the memory system via the level 1 data cache, the data requests are received serially at the point of access to the level 1 data cache and any miss that is generated will be handled in the usual way by the BIU as shown. This means that circuitry already present controls the accesses generated by the preload circuitry and no additional control or hazard checking is required.

Figure 6:
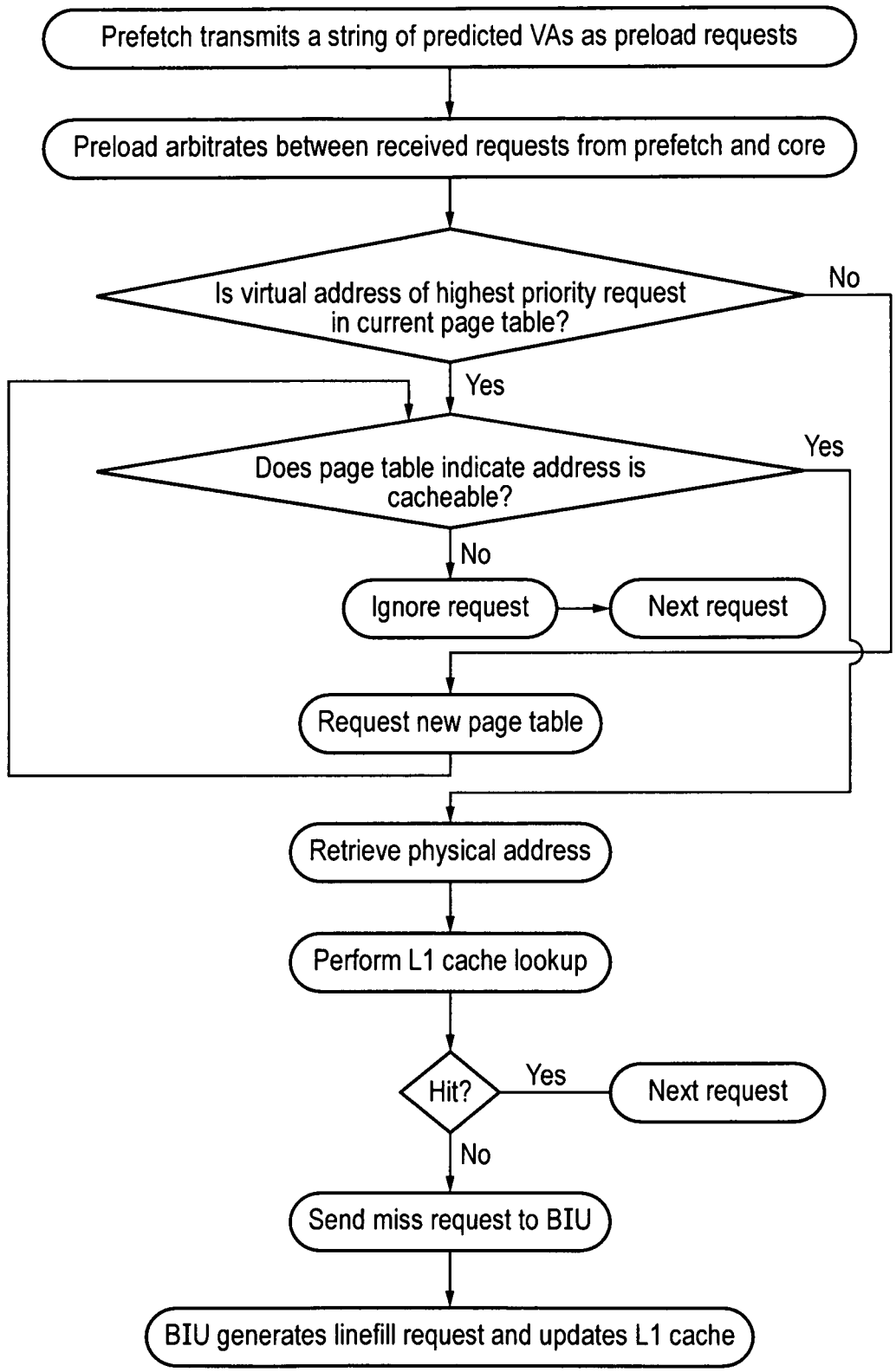
FIG. 6 shows steps in a method according to an embodiment of the present invention.

FIG. 6 shows a flow diagram illustrating steps in a method according to an embodiment of the present invention. Prefetch circuitry transmits a string of predicted virtual addresses as preload requests. In this example they are sent as simple preload requests with no particular characteristics. The preload circuitry arbitrates between requests received from the prefetch circuitry and from the core. It then determines which of the requests has the highest priority and then looks the virtual address of that request up in the current page table of its own μTLB. If it is present it checks that the page table indicates that the address is cacheable. If it is not cacheable it simply ignores the request and looks for the next highest priority request. In this regard as these are simply requests to preload data in advance, which requests are generated to improve performance, the dropping of requests where there seems to be a problem does not generate errors. All that occurs is that if that request is later made by the processor, it will be processed by the load store unit which has hazard checking circuitry which is configured to handle such issues.

If the page table does indicate that the address is cacheable then the physical address is retrieved. If the virtual address was not in the current page table then a new page table is requested from the memory management unit and when this page table has been retrieved it is checked to see whether or not the address is cacheable. Once the physical address has been retrieved a look up in the L1 cache can be performed. If there is a hit then the procedure has finished and the next request is processed. If there is not a hit then a miss request is sent to the bus interface unit and the bus interface unit then processes this miss as it would process any other miss by generating a linefill request and updating the L1 cache. If the bus interface unit detects problems at any point with the linefill then it will simply drop it as it will understand that it is from the preload unit and as such can be dropped.

In the example given for FIG. 6 the prefetch sends its request using the virtual address. In some embodiments it will send physical addresses rather than virtual addresses. In such a case it will send an indication with these that the preload circuitry does not need to do a page table look up as the physical address is present. However, the preload circuitry must check that the physical address that is of the current page table is cacheable and if it is not it will ignore the request. The prefetch circuitry 80 will detect when one of its predicted addresses is crossing a page table and will then stall until its monitoring of access requests within the load/store pipeline detects access requests in the next page table whereupon it will start predicating again. Thus, the method for prefetching using physical addresses would be very similar to that using virtual addresses except that there is no look up of the physical address although there is a determination that the address is cacheable. This determination will be made for the whole of the page table and thus, is only performed once per page table.

Although, in the example shown in FIG. 6 the requests were simple loads, in some cases the prefetch circuitry may generate write requests and in this case, it may transmit the predicted write request as a preload write instruction and the preload circuitry will send this request for the address with the further requirement that when the linefill is performed the properties are set such that there is exclusive access for one particular core. The preload unit can generate these instructions and thus, there is no additional overhead in requesting them by the prefetch unit where applicable.

Figure 7:
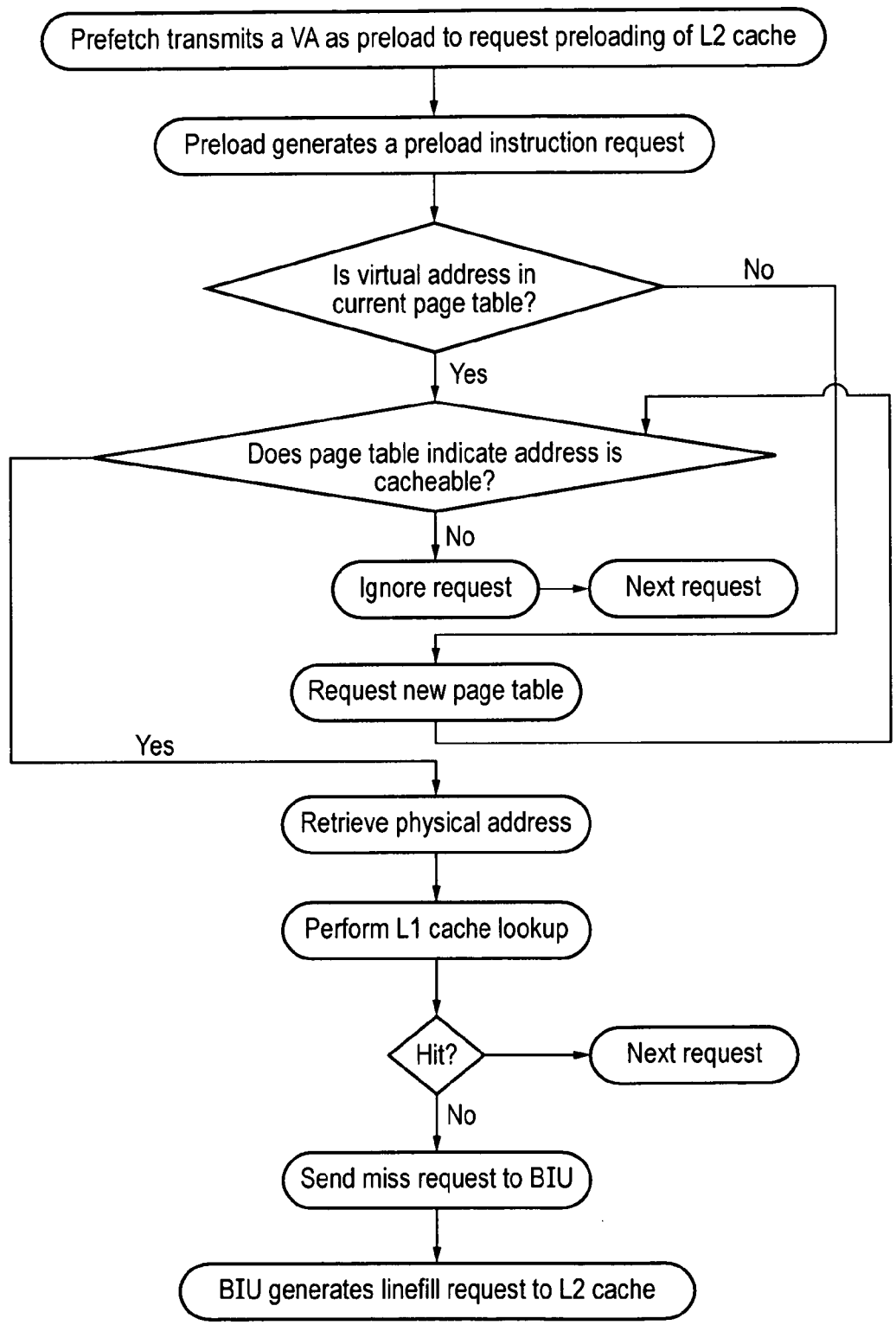
FIG. 7 shows a flow diagram illustrating steps in a further method according an embodiment of the present invention.

FIG. 7 shows a flow diagram illustrating a method of prefetching instructions into the L2 cache. The prefetch unit recognises that the resources of the L1 cache are very valuable and that it will not be advantageous to over fill it with data that it has predicted may be required. Thus, the prefetch unit may in some cases have a maximum limit that it determines is suitable for the number of lines that should be used in the L1 cache for prefetched data when it determines that it has filled the L1 cache to this extent it will request that the subsequent requests are not filled to the L1 data cache but are filled to the L2 data cache. It is able to do this as the preload circuitry is configured to process preload instruction requests where instructions are preloaded into the L2 cache.

Thus, where the prefetch circuitry indicates to the preload unit that it requires its request to be loaded into the L2 cache then the preload circuitry simply generates a preload instruction request.

The preload circuitry then acts in a similar way to the way it acted in the example of FIG. 6 by determining if the virtual address is in the current page table and if the address is cacheable. If it is not cacheable the request is simply ignored, while if the page table is not present a new one is requested. The physical address is then retrieved if the address in the new page table is cacheable and an L1 cache lookup is performed. If there is a miss then the request is sent to the bus interface unit which generates a linefill request to the L2 cache. In this way, the data is preloaded into the L2 cache unless it is already present in the L1 cache whereupon it is left there.

Although in the examples shown it is the prefetching and preloading of data that is considered it would be clear to a skilled person that similar techniques could be used for the preloading and prefetching of instructions. In this regard, it is generally quite important for the performance of a device that the prediction of instructions is done well and this is generally therefore performed efficiently. Thus, the above technique may generally be less interesting on the instruction side, although there may be circumstances where it does improve performance. In such an embodiment there would be a preload instruction unit and a prefetch instruction unit, the prefetch instruction unit sending requests via the preload instruction unit.

Although illustrative embodiments have been described in detail herein with reference to the accompanying drawings, it is to be understood that the claims are not limited to those precise embodiments, and that various changes and modifications can be effected therein by one skilled in the art without departing from the scope and spirit of the appended claims. For example, various combinations of the features of the following dependent claims could be made with the features of the independent claims.

We claim:

1. A data processing apparatus comprising:
  at least one processor for processing data in response to instructions said instructions indicating storage locations for said data and for said instructions by virtual addresses;
  a hierarchical data storage system for storing said data and said instructions in storage locations identified by physical addresses, said hierarchical data storage system comprising a memory and at least one cache;
  address translation circuitry for mapping said virtual addresses to said physical addresses;
  load store circuitry configured to receive access requests from said at least one processor, said access requests indicating storage locations to be accessed as virtual addresses, said load store circuitry being configured to access said address translation circuitry to identify said physical addresses that correspond to said virtual addresses of said received access requests, and to access said corresponding physical addresses in said hierarchical data storage system;
  preload circuitry configured to receive preload requests from said processor indicating by virtual addresses storage locations that are to be preloaded into at least one of said at least one caches, said preload circuitry having access to said address translation circuitry such that said corresponding physical addresses can be identified; and
  prefetch circuitry configured to monitor at least some of said accesses performed by said load store circuitry and to predict addresses to be accessed subsequently, said prefetch circuitry being configured to transmit said predicted addresses to said preload circuitry as preload requests; wherein
  said preload circuitry is configured to respond to said preload requests from said processor and from said prefetch circuitry to preload at least one of said at least one caches with said requested storage locations,
  wherein said prefetch circuitry is configured to transmit predicted physical addresses within a predetermined range to said preload circuitry such that they are located within in a same page table as said monitored access requests and on a predicted address being outside of said page table to stop sending said predicted addresses, until said monitored addresses move to a new page table.

2. A data processing apparatus according to claim 1, wherein said preload circuitry is arranged in parallel with and independent from said load store circuitry.

3. A data processing apparatus according to claim 1, wherein said prefetch circuitry is configured to transmit virtual addresses to said preload circuitry as said predicted addresses, said preload circuitry converting said virtual addresses to said corresponding physical addresses using said address translation circuitry.

4. A data processing apparatus according to claim 1, wherein said prefetch circuitry is configured to transmit physical addresses to said preload circuitry as said predicted addresses.

5. A data processing apparatus according to claim 1, wherein said prefetch circuitry is configured to monitor addresses of a set of accesses to said at least one cache and to predict said addresses to be accessed in dependence upon a pattern of said monitored addresses.

6. A data processing apparatus according to claim 1, wherein said addresses monitored are physical addresses.

7. A data processing apparatus according to claim 1, wherein said prefetch circuitry is configured to monitor addresses of misses in said at least one cache and to predict said addresses to be accessed in dependence upon a pattern of said address misses.

8. A data processing apparatus according to claim 1, wherein said preload circuitry comprises arbitration circuitry configured to arbitrate between requests received from said processor and said prefetch circuitry and to prioritise requests received from said processor.

9. A data processing apparatus comprising:
  at least one processor for processing data in response to instructions said instructions indicating storage locations for said data and for said instructions by virtual addresses;
  a hierarchical data storage system for storing said data and said instructions in storage locations identified by physical addresses, said hierarchical data storage system comprising a memory and at least one cache;
  address translation circuitry for mapping said virtual addresses to said physical addresses;
  load store circuitry configured to receive access requests from said at least one processor, said access requests indicating storage locations to be accessed as virtual addresses, said load store circuitry being configured to access said address translation circuitry to identify said physical addresses that correspond to said virtual addresses of said received access requests, and to access said corresponding physical addresses in said hierarchical data storage system;
  preload circuitry configured to receive preload requests from said processor indicating by virtual addresses storage locations that are to be preloaded into at least one of said at least one caches, said preload circuitry having access to said address translation circuitry such that said corresponding physical addresses can be identified; and
  prefetch circuitry configured to monitor at least some of said accesses performed by said load store circuitry and to predict addresses to be accessed subsequently, said prefetch circuitry being configured to transmit said predicted addresses to said preload circuitry as preload requests; wherein said preload circuitry is configured to respond to said preload requests from said processor and from said prefetch circuitry to preload at least one of said at least one caches with said requested storage locations, wherein said hierarchical data store comprises a level 1 data cache which is located close to said at least one processor and is fast to access, a level 2 data cache which is larger than said level 1 data cache and is slower to access, and said preload circuitry is responsive to:

a preload data request received from said at least one processor to update said level 1 data cache with said storage location indicated by said virtual address;

a preload data with intent to write request received from said at least one processor to preload said level 1 data cache with said storage location indicated by said virtual address and to set an exclusive access permission for said storage location such that only said at least one processor issuing said request can access said storage location; and said prefetch circuitry is configured to monitor write misses to said level 1 data cache and to predict said addresses to be accessed in dependence upon a pattern of said write misses and to transmit said predicted addresses with an indication that they should be sent further by the preload circuitry as preload data with intent to write requests such that said level 1 data cache is loaded with said storage locations indicated by said predicted addresses and an exclusive access permission for said storage locations is set.

10. A data processing apparatus comprising:

at least one processor for processing data in response to instructions said instructions indicating storage locations for said data and for said instructions by virtual addresses;

a hierarchical data storage system for storing said data and said instructions in storage locations identified by physical addresses, said hierarchical data storage system comprising a memory and at least one cache;

address translation circuitry for mapping said virtual addresses to said physical addresses;

load store circuitry configured to receive access requests from said at least one processor, said access requests indicating storage locations to be accessed as virtual addresses, said load store circuitry being configured to access said address translation circuitry to identify said physical addresses that correspond to said virtual addresses of said received access requests, and to access said corresponding physical addresses in said hierarchical data storage system;

preload circuitry configured to receive preload requests from said processor indicating by virtual addresses storage locations that are to be preloaded into at least one of said at least one caches, said preload circuitry having access to said address translation circuitry such that said corresponding physical addresses can be identified; and prefetch circuitry configured to monitor at least some of said accesses performed by said load store circuitry and to predict addresses to be accessed subsequently, said prefetch circuitry being configured to transmit said predicted addresses to said preload circuitry as preload requests; wherein said preload circuitry is configured to respond to said preload requests from said processor and from said prefetch circuitry to preload at least one of said at least one caches with said requested storage locations, wherein said hierarchical data store comprises a level 1 data cache which is located close to said at least one processor and is quick to access, a level 2 data cache which is larger than said level 1 data cache and is slower to access, and said preload circuitry is responsive to:

a preload data request received from said at least one processor to update said level 1 data cache with said storage location indicated by said virtual address;

a preload instruction request received from said at least one processor to update said level 2 cache with said storage location indicated by said virtual address; and said prefetch circuitry is configured to transmit said predicted addresses with an indication that they should be sent further by the preload circuitry as preload instruction requests such that said level 2 cache is loaded with said storage locations indicated by said at least some of said predicted addresses.

11. A data processing apparatus comprising:

at least one processor for processing data in response to instructions said instructions indicating storage locations for said data and for said instructions by virtual addresses;

a hierarchical data storage system for storing said data and said instructions in storage locations identified by physical addresses, said hierarchical data storage system comprising a memory and at least one cache;

address translation circuitry for mapping said virtual addresses to said physical addresses;

load store circuitry configured to receive access requests from said at least one processor, said access requests indicating storage locations to be accessed as virtual addresses, said load store circuitry being configured to access said address translation circuitry to identify said physical addresses that correspond to said virtual addresses of said received access requests, and to access said corresponding physical addresses in said hierarchical data storage system;

preload circuitry configured to receive preload requests from said processor indicating by virtual addresses storage locations that are to be preloaded into at least one of said at least one caches, said preload circuitry having access to said address translation circuitry such that said corresponding physical addresses can be identified; and prefetch circuitry configured to monitor at least some of said accesses performed by said load store circuitry and to predict addresses to be accessed subsequently, said prefetch circuitry being configured to transmit said predicted addresses to said preload circuitry as preload requests; wherein said preload circuitry is configured to respond to said preload requests from said processor and from said prefetch circuitry to preload at least one of said at least one caches with said requested storage locations, wherein said load store unit is configured to propagate said virtual address along with said physical address for said access requests at least as far as a bus interface unit, which controls access to a bus via which said hierarchical data store is accessed;

said prefetch circuitry being configured to monitor said access requests transmitted by said bus interface unit.

12. A method of preloading storage locations within a hierarchical data storage system within a data processing apparatus, said data processing apparatus comprising at least one processor for processing data in response to instructions said instructions indicating storage locations for said data and for said instructions by virtual addresses, address translation circuitry for converting said virtual addresses to said physical addresses; said hierarchical data storage system storing said data and said instructions in storage locations identified by physical addresses, said hierarchical data storage system comprising a memory and at least one cache; said method comprising receiving access requests from said at least one processor at load store circuitry, said access requests indicating storage locations to be accessed as virtual addresses accessing address translation circuitry to convert said virtual addresses of said received access requests to corresponding physical addresses, and accessing said corresponding physical addresses in said hierarchical data storage system;

receiving preload requests from said processor indicating by virtual addresses storage locations that are to be preloaded into one of said at least one caches, at preload circuitry;

identifying corresponding physical addresses using said address translation circuitry;

loading said storage locations into one of said at least one caches; and monitoring at least some of said accesses performed by said load store circuitry and predicting addresses to be accessed subsequently using prefetch circuitry;

transmitting said predicted addresses to said preload circuitry as preload requests;

loading said requested storage locations into one of said at least one cache, wherein said step of transmitting said predicted addresses comprises transmitting said predicted addresses within a predetermined range to said preload circuitry such that they are located within in a same page table as said monitored access requests and on a predicted address being outside of said page table stopping transmitting said predicted addresses until said monitored addresses move to a new page table.

13. A method according to claim 12, wherein said step of monitoring at least some of said accesses comprises monitoring addresses of a set of accesses to said at least one cache and said step of predicting said addresses to be accessed is performed in dependence upon a detected pattern of said monitored addresses.

14. A method according to claim 13, wherein said addresses monitored are physical addresses.

15. A method according to claim 13, wherein said addresses monitored are virtual addresses.

16. A method according to claim 12, wherein said step of monitoring at least some of said accesses comprises monitoring addresses of misses in said at least one cache and said step of predicting said addresses to be accessed is performed in dependence upon a detected pattern of said address misses.

17. A method according to claim 12, further comprising a step of arbitrating between requests received from said processor and said prefetch circuitry such that said requests received from said processor are prioritised.

18. A data processing apparatus comprising:

at least one processing means for processing data in response to instructions said instructions indicating storage locations for said data and for said instructions by virtual addresses;

a hierarchical data storage means for storing said data and said instructions in storage locations identified by physical addresses, said hierarchical data storage means comprising a memory and at least one caching means;

address translation means for mapping said virtual addresses to said physical addresses;

load store means for receiving access requests from said at least one processing means, said access requests indicating storage locations to be accessed as virtual addresses, said load store means being configured to access said address translation circuitry to identify said physical addresses that correspond to said virtual addresses of said received access requests, and to access said corresponding physical addresses in said hierarchical data storage system;

preload means for receiving preload requests from said processing means indicating by virtual addresses storage locations that are to be preloaded into at least one of said at least one caching means, said preload means having access to said address translation means such that said corresponding physical addresses can be identified; and prefetch means for monitoring at least some of said accesses performed by said load store means and for predicting addresses to be accessed subsequently, said prefetch means transmitting said predicted addresses to said preload means as preload requests; wherein said preload means is for preloading at least one of said at least one caching means with said requested storage locations in response to said preload requests from said processing means and from said prefetch means, wherein said prefetch means is configured to transmit predicted physical addresses within a predetermined range to said preload means such that they are located within in a same page table as said monitored access requests and on a predicted address being outside of said page table to stop sending said predicted addresses, until said monitored addresses move to a new page table.

\* \* \* \* \*